US006087011A

United States Patent [19]

Beach et al.

[11] Patent Number: 6,087,011

[45] Date of Patent: Jul. 11, 2000

[54] POLYURETHANE ROLLER WITH OXIDE SURFACE LAYER

[75] Inventors: Bradley Leonard Beach; Todd Lucas Janes; Jean Marie Massie, all of Lexington; Donald Wayne Stafford, Richond, all of Ky.

[73] Assignee: Lexmark International, Inc., Lexington, Ky.

[21] Appl. No.: 09/170,696

[22] Filed: Oct. 13, 1998

[51] Int. Cl.[7] ...................................................... B32B 27/40

[52] U.S. Cl. .................................... 428/425.9; 428/423.1; 428/425.8; 492/59

[58] Field of Search .............................. 428/423.1, 425.8, 428/425.9; 492/59

[56] References Cited

U.S. PATENT DOCUMENTS

| | | | |
|---|---|---|---|
| 5,707,743 | 1/1998 | Janes et al. | 428/423.1 |
| 5,804,114 | 6/1997 | Janes et al. | 264/82 |

FOREIGN PATENT DOCUMENTS

| | | |
|---|---|---|
| 2 300 050 | 10/1996 | United Kingdom . |

*Primary Examiner*—D. S. Nakarani
*Attorney, Agent, or Firm*—John A. Brady

[57] ABSTRACT

An electrophotographic developer roller with a highly resistive layer over a conductive core is made by mixing polyurethane and ferric chloride. After curing, the roller is soaked in hydrogen peroxide to oxidize the outer surface. The oxidized surface layer is electrically resistive. An excellent developer roller is achieved at low production cost.

2 Claims, No Drawings

POLYURETHANE ROLLER WITH OXIDE SURFACE LAYER

RELATED APPLICATIONS

U.S. Pat. No. 5,707,743; filed Apr. 9, 1996, is to rollers as surface layer of oxidized polydiene. U.S. Pat. No. 5,804,114, filed Jun. 6, 1997, is a division of the foregoing U.S. Pat. No. No. 5,707,443, directed to process coverage. U.S. patent application Ser. No. 08/423,481, filed Apr. 19, 1995, a counterpart of which was published as UK Patent Application 2 300 050 on Oct. 23, 1996, having some common inventors with this application, is to a developer roller having a polycaprolactone ester body and ferric chloride filler, as do the embodiments of this application.

TECHNICAL FIELD

This invention relates to developer rollers used in electrophotography, and, more specifically, to a roller and its process of manufacture having a surface with a high electrical resistivity layer.

BACKGROUND OF THE INVENTION

A functional developer roller for use in contact electrophotographic printing having a high resistance surface layer over a semi-conductive core gives excellent print performance independent of the speed of movement of the printing members (termed process speed). This is an improvement over a more common method which involves making a semi-conductive core and subsequently coating that core with a resistive material in a separate process such as spray or dip coating.

By using the novel combination of materials described in the foregoing U.S. Pat. No. 5,707,743; a high resistance surface layer over a more conductive core can be produced simply by oxidizing the roll surface. This eliminates the need for coating the conductive roll with a resistive layer in a separate process. This process is an improvement over a more common method which involves making a semi-conductive core and then subsequently coating the core with a resistive material in a separate process such as spray or dip coating. Oxidizing can be more cost effective than spray or dip coating and produces a roller with less defects. The oxidized polydiene-based roll of this invention mimics the electrical performance of the coated roller and gives excellent print performance over a wide range of process speeds.

DISCLOSURE OF THE INVENTION

The roller of this invention is a cast urethane, electrically conductive rubber roller with a surface layer of high electrical resistivity of oxidized ferric chloride. This roller mimics the electrical properties of a coated roller. The cured roller is composed of a polyurethane containing particulate ferric chloride. The roller is soaked in a bath of oxidizing agent to achieve the resistive surface layer. The bulk resistivity of the roller is approximately 1×18 (one times ten to the eighth power) ohm-cm at 22° C. and 50% relative humidity. The cost of production is low.

BEST MODE FOR CARRYING OUT THE INVENTION

In electrophotography, the developer roller function is to develop a layer of toner on a photoconductor drum charged in an image pattern. A two layer, "coated" roll will develop a fixed quantity of toner per volt of development bias that is determined by the dielectric thickness of the photoconductor, the toner and the developer roller. This development characteristic is independent of process speed, within limits. In contrast, a solid roll of a single resistivity develops a quantity of toner based on the dielectric constants of the photoconductor and the toner, and the resistance of the roll in the photoconductor nip. This is dependent on process speed. In addition, a two-layer roll has a longer time constant than a solid roll. Longer time constant materials leave a higher effective development surface potential on the developer roll at the entry to the photoconductor nip. This improves the single pel dot print performance of the roll. Known electrical models, such as that of H. Tachibana, at p. 2260, Conference Record IEEE IAS 1989 can be used to evaluate print performance of these rollers for different print speeds, roller electrical properties, and other such factors.

Results indicate that a two layer, "coated" roll will develop a fixed quantity of toner per volt of development bias that is determined by the dielectric thicknesses of the photoconductor, the toner and the developer roll. This development characteristic is independent of process speed, within limits. In contrast, a solid roll of a single resistivity develops a quantity of toner based on the dielectric constants of the photoconductor and the toner, and the resistance of the roll in the photoconductor nip. This is dependent on process speed. In addition, a two-layer roll has a longer time constant than a solid roll. Longer time constant materials leave a higher effective development surface potential on the developer roll at the entry to the photoconductor nip. This improves the single pel dot print performance of the roll.

Therefore, the print performance of a two-layer roller is superior to that of a solid roll across a wide process speed range and is less sensitive to office-environments. The desired electrical properties during normal operation of a two-layer roller are a core resistivity less than $1\times10^9$ C. ohm-cm, preferably less than $3\times10^8$ ohm-cm, at 22° C. and 50% relative humidity (RH), a coating resistivity of $5\times10^9$–$2\times10^{12}$ ohm-cm, preferably $1\times10^{11}$ ohm-cm, at 22° C. and 50% RH and a coating thickness of approximately 50–150 microns, preferably approximately 100 microns, at 22° and 50% RH. The time constant should be about 5–2,000 milliseconds, preferably about 100 milliseconds, at 22° C. and 50% RH.

A common technique to produce a semi-conductive roll with a resistive layer is to prepare a core using any standard rubber molding technique, such as casting liquid urethanes or rubber transfer molding. The core is then ground to the correct dimensions and either spray or dip coated with a resistive material to the desired thickness. The coating is usually applied in several layers to build up the desired thickness of 100 microns. Problems with this process include its higher cost due to the multiple coating steps and the defects introduced into the surface layer during the coating process.

Using the unique combination of materials described in this application, a resistive surface layer can be produced on a cast urethane roller simply by soaking the roller in a peroxide solution. The ferric chloride is oxidized by the peroxide and converted to ferric oxide, which is non-conductive. This produces a high resistivity layer at the surface. The thickness and resistivity of this layer can be controlled by varying the concentration of peroxide, the solvent used, the soaking time and level of ferric chloride.

Any type of polyurethane can be used, including polyether based or polyester based urethanes. The preferred type is polycaprolactone urethane, such as Vibrathane 6060 (trademark product of Uniroyal Chemical), because of its stable electrical resistivity across a range of temperature and humidity. Vibrathane 6060 is a polycaprolactone ester toluene-diisocyanate prepolymer. The Vibrathane 6060 is cured with polyol curatives, such as Voranol 234–630 (trademark product of Dow Chemical Co. Inc.), a trifunctional polyol. Ferric choride is added to the urethane to reduce the electrical resistivity of the roll core to <1E9 ohm cm. Other conductive additives that can be oxidized to form non-conductive oxides can be used, such as ferrous chloride. Typical concentrations of ferric chloride range from 0.05–0.30 parts by weight per hundred rubber, preferably 0.1–0.25 parts by weight per hundred by weight rubber. The combination of urethane and ferric chloride produces a roll with a single resistivity from the surface to the bulk. In order to produce a roll with a high resistivity surface layer, the roll must be oxidized by peroxide.

The urethane formulation is cast into a mold around a central, metal shaft and then cured at approximately 100 degrees C. for 16 hours using a combination of curing in a mold, demolding and postcuring in an oven to produce a rubber roller. The roller is then ground to the correct dimensions. The roller does not have a resistive layer on the surface. This is produced by soaking the roll in peroxide solution. This soaking procedure oxidizes the ferric chloride and converts it into non-conductive iron oxide. This process produces a highly resistive surface layer. The thickness and electrical resistivity of this surface layer can be controlled by varying the peroxide concentration, the solvent, the soaking time and the ferric chloride level.

Any type of peroxide can be used to produce the resistive layer, as long as it forms peroxy free radicals which can oxidize the conductive additive to form a non-conductive oxide. These peroxides can include, for example, hydrogen peroxide, benzoyl peroxide, or dicumyl peroxide. In this example, a hydrogen peroxide solution as received (30% w/w in water, from Aldrich) is diluted with isopropyl alcohol (IPA), water or any suitable solvent to produce a final solution of the desired concentration. The best solvents to use are those that can easily swell the urethane rubber and allow the hydrogen peroxide to enter the roller. IPA is a much more effective solvent than water. Other solvents that could be used include toluene, methanol, tetrahydrofuran, methyl ethyl ketone, etc. Typical concentrations used are between 1% and 25% $H_2O_2$. The rolls are typically soaked in the solutions for times ranging from 1–16 hours. The rolls are then dried at 70° C. for 3 hours.

The rollers are characterized by a variety of electrical techniques. A roll is typically cleaned with isopropyl alcohol and may be painted with conductive carbon paint in a 10 mm strip down the roll. Alternatively, a 10 mm strip of conductive carbon tape is placed down the roll. A circuit is made by making electrical contact with the painted surface and the roller shaft. The DC resistivity of the roll at 100V, the AC resisitivity of the roll at 1 KHz, and the time constant are measured. The time constant is measured by applying a 100 volt bias to the roll, removing the voltage and measuring the time for voltage on the roll to decay to 1/e (37%) of its original value. This time constant is related to the thickness and resistivity of the surface layer on the roll. The roller is modeled as two parallel RC circuits in series. One RC circuit represents the core and the second represents the coating. Based on this model, the following equations apply:

$$\text{tau}=R*C=\text{rho}_c*\text{Kc}*\text{epsilon}_o$$

$$\text{rho}_c=\text{tau}/(\text{Kc}*\text{epsilon}_o)$$

$$T=R*A/\text{rho}_c$$

where tau=time constant $\text{rho}_c$=coating resitivity

C=capacitance

Kc=dielectric constant of coating $$\text{Epsilon}_o=8.85\times10^{-12}\ \text{Coulombs}^2/\text{Newtons}\times\text{Meters}^2 \text{ (permitivity of free space)}$$

T=thickness of resistive layer

R=roll DC resistance

A=surface area of roll

Therefore, the coating thickness and resistivity can be calculated from the time constant and DC resistance measurements. The dielectric constant of the coating is assumed to be 10, a typical value for polyurethane rubber.

TABLE 1

COATING THICKNESS AND RESISTIVITY FOR HYDROGEN PEROXIDE TREATED VIBRATHANE 6060 ROLLS

| H2O2 Concentration | Soaking Time (hrs) | Rho C 100 V (ohm-cm) | Thickness 100 V (microns) |
|---|---|---|---|
| 2% | 0 | 6.1E+08 | 0 |
| 2% | 3 | 3.7E+09 | 464 |
| 5% | 3 | 1.7E+10 | 169 |
| 5% | 4 | 2.2E+10 | 215 |
| 5% | 6 | 1.9E+10 | 435 |
| 5% | 16 | 3.0E+10 | 1285 |
| 10% | 1 | 9.9E+10 | 58 |
| 10% | 2 | 8.8E+10 | 91 |
| 10% | 3 | 4.3E+10 | 167 |
| 10% | 4 | 5.4E+10 | 250 |
| 10% | 6 | 4.1E+10 | 536 |
| 10% | 16 | 8.8E+10 | 926 |
| 20% | 1 | 1.9E+10 | 104 |
| 20% | 2 | 2.6E+10 | 133 |
| 20% | 3 | 4.2E+10 | 142 |
| 20% | 4 | 2.8E+10 | 358 |
| 25% | 1 | 1.3E+10 | 148 |
| 25% | 2 | 1.5E+10 | 152 |

A summary of the calculated coating thickness and resistivity data is shown in Table 1 as a function of hydrogen peroxide concentration and soaking time using IPA as a solvent. Increasing the soaking time and solution concentration increases both the coating thickness and electrical resistivity. By the correct combination of solvent, solution concentration and soaking time, as well as by adjusting the level of the conductive additive, a roll with the desired resistivity and thickness can be produced.

The resistive surface layer produced by the oxidation process is permanent. Oxidized rolls have been analyzed for several months without a significant change in electrical properties.

Specific working applications of this invention include:

Vibrathane 6060+.1 PHR FeC13

Soaked in 10% hydrogen peroxide in IPA for 2 hours

Variations will be apparent and can be anticipated. Patent coverage is sought as provided by law, with particular reference to the accompanying claims.

We claim:

1. An endless developer member comprising a body of polyurethane and a ferric chloride filler, said member having an outer surface of oxidized ferric chloride produced by soaking said member in a bath of oxidizing agent.

2. The developer member of claim 1 in which said polyurethane is a polycaprolactone ester polyurethane.

* * * * *